N. F. GILMAN.
GRAIN BINDER.
No. 93,985.          Patented Aug. 24, 1869.
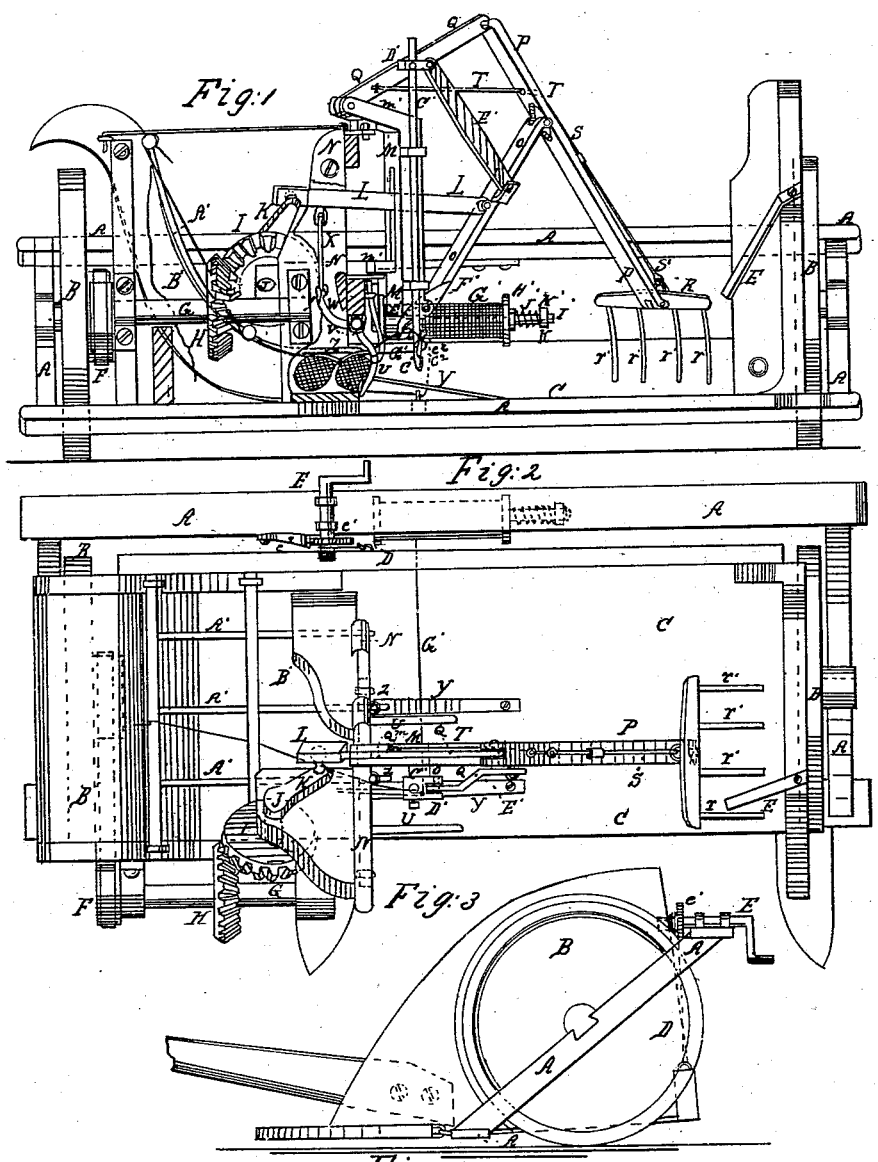

UNITED STATES PATENT OFFICE.

N. F. GILMAN, OF ROCHESTER, MINNESOTA.

IMPROVEMENT IN GRAIN-BINDERS.

Specification forming part of Letters Patent No. 93,985, dated August 24, 1869.

*To all whom it may concern:*

Be it known that I, N. F. GILMAN, of Rochester, in the county of Olmsted and State of Minnesota, have invented a new and useful Improvement in Grain-Binders; and I do hereby declare that the following is a full, clear, and exact description thereof, which will enable others skilled in the art to make and use the same, reference being had to the accompanying drawing, forming part of this specification, in which—

Figure 1 is a front view of my improved machine, parts being broken away to show the construction. Fig. 2 is a top view of the same. Fig. 3 is an end view of the same.

Similar letters of reference indicate corresponding parts.

My invention has for its object to furnish an improvement in the method of binding grain as it is cut by a reaper, by means of an apparatus which shall be simpler than those usually applied, requiring a machinery less complex, and, consequently, less liable to get out of order from the roughness of the grain-field; and it consists in the manner of binding the grain, and in the construction and combination of the various parts of the apparatus by means of which this is accomplished.

A represents the frame of the reaper-platform, the end bars of which are inclined, and have journal-boxes attached to them, in which work the journals of the wheels B. C is the platform, the forward edge of which rests upon the front longitudinal bar of the frame A, and the rear part of which is supported by the cord or chain D, one end of which is attached to the rear part of the said platform, and the other end of which is attached to the windlass E, so that the said platform may be adjusted as desired.

The windlass E is provided with a ratchet-wheel and pawl, $e^1$ $e^2$, so that it may be held securely in any desired position. F is a pulley attached to the shaft G, which receives motion from the drive-wheel B by a band which passes around a pulley attached to said drive-wheel, and which should be provided with a tension-pulley to keep it taut, however the platform C may be adjusted.

The shaft G revolves in bearings in supports attached to the platform C, and to it is attached a bevel-gear wheel, H, into the teeth of which mesh the teeth of the bevel-gear wheel I, attached to the shaft J, which revolves in bearings in supports attached to the platform C. The shaft J is set in an inclined position, and to its inner end is attached, or upon it is formed, a crank, K, the crank-pin of which is connected with the end of the pitman L by a ball-and-socket joint.

The pitman L passes through a vertical slot in the vertical bar M, which is pivoted to the supporting frame-work N by means of rearwardly-projecting arms $m^1$ $m^2$, as shown in Fig. 1. The forward end of the pitman L is hinged to the lever O, the lower end of which is hinged to the lower end of the vertical bar M, and the upper end of which is hinged to the lever P. To the upper end of the lever P is hinged the upper end of the bar or lever Q, the lower end of which is pivoted to the rearwardly-projecting end of the arm $m^1$ of the vertical bar M. R is the rake-head, to which the rake-teeth $r$ are attached, and which is hinged at the lower edge of its middle part to the lower end of the lever P, so that the said rake-head R, while sweeping the grain across the platform C, may be held steady by resting upon the rear side of the end of the lever P, as shown in Fig. 1, and, at the same time, be free to fold up while passing back over the platform C. S is a rod, the lower end of which is pivoted to the upper edge of the rake-head R, which passes up along the lever P, where it is kept in place by a keeper, and to its upper end is attached a cord, T, which passes through a hole in the said lever P, and its other end is attached to the lever Q. The cord T should be of such a length that when the rake-head is extended to the farther end of the platform C, the said cord will be drawn taut, so as to extend the rake-head into proper position to sweep the grain across the platform. As the grain is swept across the platform C, it is received and compressed by the arms U, rigidly attached to the shaft V, which works in bearings attached to the supporting frame-work N. To the shaft V is rigidly attached a rearwardly-projecting arm, W; to the outer end of which is pivoted the lower end of the connecting-rod X, the other end of which is pivoted to the pitman L near the crank K, as shown in Fig. 1.

The bundles of grain are held from being drawn back, after being bound, by the springs Y, attached to the platform C, and by the springs Z, the continuations of which form the guide-rack A', by which the bundles of grain are kept in place while passing up the incline B' at the end of the platform C, from which they pass into a receptacle prepared for their reception, and which is not shown in the drawings. C' is the hook, which works up and down through guides attached to the vertical bar M. To the upper end of the hook C' is adjustably secured by a set-screw a collar, D', to which is pivoted the upper end of the bar E', the lower end of which is pivoted to the bar or lever O, so that the said hook may be operated by the movement of the rake. F' is a hook attached to the lower end of the bar or lever O. $c^2$ is a small stop pivoted to the hook C', which, when down, covers the point of the hook, and enables it to be drawn through the loop, and, when raised, uncovers the hook, so that it may catch upon the cord and draw it through the loop. G' is the binding-cord, which is wound upon a spool, H', placed upon a spindle, I', at the rear side of the platform C, and held so that the cord G' may have the requisite tension by a coiled spring, $J^4$, placed upon said spindle, and adjusted with the nut K'.

In using the machine, as the hook C' begins to rise, it is moved forward, so as to catch upon the cord stretched across the hole in the platform C, into which said hook enters. As the hook C' rises, the cord G' slips over the hook F', which moves forward to receive it, forming the loop. At the same time, the grain to be bound is swept into place by the rake R, and is compressed by the arms U. As the hook again descends, it passes through the loop upon the hook F', which raises the stop $c^2$, so that the hook $c^1$ may again catch upon the cord and draw it through the loop, drawing it from the hook F', and again slipping the cord over said hook F' to form the next loop.

By the peculiar arrangement of the bars and levers by which the rake is operated, the said rake, as it moves back, moves to the rear side of the platform, until it reaches the farther end. It then moves forward along the part of the platform upon which the grain lies, sweeping the said grain into position to be bound. L' is a guard attached to the platform-frame at the farther end of said platform, to prevent the grain from falling so close to said end as to interfere with the forward movement of the rake R. In this way a series of bundles, looped together, is formed and collected in the receiver. When the receiver is filled, the binding-cord is cut and the receiver emptied for the reception of the next series of bundles.

Having thus described my invention, what I claim as new, and desire to secure by Letters Patent, is—

1. The pitman L, connecting the crank K with the bar or lever P, carrying the rake-head, when arranged to play up and down within the vertical slot of the upright bar M, as herein described, for the purpose specified.

2. The combination of the rod S and cord T with the hinged rake-head R, lever P, and bar or lever Q, substantially as herein shown and described, and for the purpose set forth.

3. The adjustable hook C', bar or lever E', and hook F', constructed and operating in combination with the vertical pivoted bar M $m^1$ $m^2$ and lever O, substantially as herein shown and described, and for the purpose set forth.

4. The arms U, shaft V, arm W, connecting-rod X, and springs Y and Z, in combination with the pitman L and rake R, substantially as herein shown and described, and for the purpose set forth.

5. Binding grain in a series of connected bundles, by a continuous looped cord, substantially as herein shown and described.

N. F. GILMAN.

Witnesses:
  E. CHAPMAN,
  L. H. HUMASON.